US008864963B2

(12) United States Patent
Lin et al.

(10) Patent No.: US 8,864,963 B2
(45) Date of Patent: Oct. 21, 2014

(54) CARBON DIOXIDE CAPTURE USING RESIN-WAFER ELECTRODEIONIZATION

(71) Applicant: UChicago Argonne, LLC, Chicago, IL (US)

(72) Inventors: YuPo J. Lin, Naperville, IL (US); Seth W. Snyder, Lincolnwood, IL (US); Michael C. Trachtenberg, Lawrenceville, NJ (US); Robert M. Cowan, Dayton, NJ (US); Saurav Datta, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/938,745

(22) Filed: Jul. 10, 2013

(65) Prior Publication Data

US 2013/0292248 A1    Nov. 7, 2013

Related U.S. Application Data

(62) Division of application No. 12/789,868, filed on May 28, 2010, now Pat. No. 8,506,784.

(60) Provisional application No. 61/217,387, filed on May 29, 2009.

(51) Int. Cl.
*C25B 9/18* (2006.01)
*C25B 1/00* (2006.01)
(Continued)

(52) U.S. Cl.
CPC .......... *B01D 61/48* (2013.01); *B01D 2251/404* (2013.01); *B01D 2257/504* (2013.01); *C01B 31/20* (2013.01); *B01D 61/422* (2013.01);
(Continued)

(58) Field of Classification Search
CPC .......... B01D 53/1425; B01D 53/1475; B01D 53/0407; B01D 53/62; B01D 61/422; B01D 61/445; B01D 61/48; B01D 61/485; B01D 2257/504; C01B 31/24; Y02C 10/04
USPC ......... 204/258, 520, 524, 536, 537, 538, 630, 204/631, 632; 205/763
See application file for complete search history.

(56) References Cited

U.S. PATENT DOCUMENTS

| 3,330,750 A | 7/1967 | McRae et al. |
| 3,896,015 A | 7/1975 | McRae |

(Continued)

FOREIGN PATENT DOCUMENTS

| KR | 2002-0065821 | 8/2002 |
| KR | 10-0697681 B1 | 3/2007 |
| WO | 02-096807 A2 | 12/2002 |

*Primary Examiner* — Keith Hendricks
*Assistant Examiner* — Steven A. Friday
(74) *Attorney, Agent, or Firm* — Olson & Cepuritis, Ltd.

(57) ABSTRACT

The present invention provides a resin-wafer electrodeionization (RW-EDI) apparatus including cathode and anode electrodes separated by a plurality of porous solid ion exchange resin wafers, which when in use are filled with an aqueous fluid. The apparatus includes one or more wafers comprising a basic ion exchange medium, and preferably includes one or more wafers comprising an acidic ion exchange medium. The wafers are separated from one another by ion exchange membranes. The fluid within the acidic and/or basic ion exchange wafers preferably includes, or is in contact with, a carbonic anhydrase (CA) enzyme to facilitate conversion of bicarbonate ion to carbon dioxide within the acidic medium. A pH suitable for exchange of $CO_2$ is electrochemically maintained within the basic and acidic ion exchange wafers by applying an electric potential across the cathode and anode.

6 Claims, 2 Drawing Sheets

(51) Int. Cl.
    *C01B 31/20*     (2006.01)
    *B01D 61/42*     (2006.01)
    *B01D 53/14*     (2006.01)
    *B01D 53/62*     (2006.01)
    *B01D 61/50*     (2006.01)
    *C01B 31/24*     (2006.01)
    *C25B 7/00*     (2006.01)
    *B01D 61/48*     (2006.01)
    *B01D 61/44*     (2006.01)

(52) U.S. Cl.
    CPC ............... *Y02C 10/10* (2013.01); *B01D 61/485* (2013.01); *Y02C 10/04* (2013.01); *B01D 53/1425* (2013.01); *B01D 61/44* (2013.01); *B01D 2251/606* (2013.01); *B01D 53/62* (2013.01); *B01D 61/50* (2013.01); *C01B 31/24* (2013.01); *B01D 61/445* (2013.01)

USPC ........... 204/258; 204/536; 204/537; 204/632; 205/763

(56) References Cited

U.S. PATENT DOCUMENTS

| | | |
|---|---|---|
| 4,238,305 A | 12/1980 | Gancy et al. |
| 4,969,983 A | 11/1990 | Parsi |
| 5,141,620 A | 8/1992 | Molter |
| 6,143,556 A | 11/2000 | Trachtenberg |
| 6,495,014 B1 | 12/2002 | Datta et al. |
| 6,797,140 B2 | 9/2004 | Lin et al. |
| 7,141,154 B2 | 11/2006 | Lin et al. |
| 7,306,934 B2 | 12/2007 | Arora et al. |
| 7,452,920 B2 | 11/2008 | Lin et al. |
| 7,507,318 B2 | 3/2009 | Lin et al. |
| 2008/0003662 A1 | 1/2008 | Trachtenberg |
| 2008/0187902 A1 | 8/2008 | Lin et al. |

CARBON DIOXIDE CAPTURE USING RESIN-WAFER ELECTRODEIONIZATION

CROSS-REFERENCE TO RELATED APPLICATIONS

This application is a division of application Ser. No. 12/789,868, filed May 28, 2010, which claims the benefit of U.S. Provisional Application Ser. No. 61/217,387, filed May 29, 2009, each of which is incorporated herein by reference in its entirety.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to removal of carbon dioxide from a gas stream. More particularly, the invention relates to a resin-wafer electrodeionization (EDI) apparatus and methods for removing carbon dioxide from a gas stream, such as a flue gas.

BACKGROUND OF THE INVENTION

Efficient capture and removal of carbon dioxide from flue gas is an essential technology for the development of more environmentally acceptable fossil fuel-based energy production systems, particularly for cleaner coal-based energy production. Several existing carbon dioxide capture processes utilize a vacuum to pull $CO_2$ across a membrane or from a solvent, which imparts a high energy cost for the $CO_2$ removal. Others utilize a temperature elevation to drive $CO_2$ from the solvent. $CO_2$ capture is the single most costly step in greenhouse gas (GHG) control. Capture of $CO_2$ from pulverized coal power plant flue gas is crucial for improving the environmental profile of the power generation industry. This represents a principal hurdle for commercializing new fossil fuel-based energy generation technologies in the present, $CO_2$ constrained world. Key factors in developing new $CO_2$ capture technologies include cost efficiency, and low capture energy consumption, preferably suitable for use with the relatively low pressure and dilute characteristics of flue gas feed streams. Improved $CO_2$ capture, driven by the pH dependent equilibrium between gaseous $CO_2$ and bicarbonate ion, provides a promising avenue for new capture technologies.

Electrodeionization (EDI), also known as electrochemical ion-exchange or continuous deionization, is an advanced ion-exchange technology that combines the advantages of ion-exchange and electrodialysis. In an EDI process, ion exchange resins are sequestered in dilute compartments to increase ionic conductivity, so that even with very dilute ionic feeds (e.g., $10^{-5}$ N), a stable operation with higher flux and lower energy consumption than electrodialysis becomes possible. EDI technology is presently used to make deionized water for boiler feed and high purity and industrial water applications. A particularly useful variant of EDI utilizes porous solid ion exchange resin wafers in place of traditional ion exchange beads (referred to herein as "resin-wafer EDI"). There are a number of known EDI apparatus and processes, some of which are described in patent publications and/or issued patents filed on behalf of Argonne National Laboratory (ANL) such as, for example, U.S. Pat. Nos. 6,797,140, 6,495,014, 7,306,934, 7,141,154, U.S. Patent Publication No. 2008/0187902, U.S. Pat. Nos. 7,452,920, and 7,507,318. The entire disclosure of each of the foregoing patents and publications is incorporated herein by reference.

The present invention utilizes resin-wafer EDI to facilitate removal of $CO_2$ from a gas stream at a significantly decreased energy consumption compared to the currently used technologies.

SUMMARY OF THE INVENTION

The present invention provides a resin-wafer electrodeionization (RW-EDI) apparatus for removing carbon dioxide from a gas stream. The apparatus comprises cathode and anode electrodes separated by a plurality of porous solid ion exchange resin wafers, which when in use are filled with an aqueous fluid. The plurality of wafers comprises one or more basic wafers arranged in a stack between the cathode and the anode. The wafers, anode, and cathode are interleaved with ion exchange membranes. Each basic wafer comprises a porous basic ion exchange medium. Each basic wafer is adapted to (a) introduce a $CO_2$-containing gas into an aqueous fluid within the basic ion exchange medium to convert $CO_2$ from the gas into bicarbonate ion, and (b) vent a $CO_2$-depleted gas therefrom.

In use, $CO_2$ is converted to bicarbonate in the fluid within the wafer under the basic conditions of the basic ion exchange medium. The bicarbonate-containing fluid can then be transported out of the apparatus as a concentrated bicarbonate ion solution. In one preferred embodiment, the basic ion exchange medium of each wafer contains a carbonic anhydrase enzyme to facilitate conversion of gaseous $CO_2$ into bicarbonate ion. If desired the carbonic anhydrase enzyme can be chemically or biochemically bound to the basic ion exchange medium thereof to facilitate conversion of gaseous $CO_2$ into bicarbonate ion. The basic pH value of the basic ion exchange medium is maintained by applying an electric potential appropriate to achieve the desired current (e.g., commonly about 1 to 6 volts per cell pair) across the cathode and anode to provide a driving force for transport of protons ($H^+$) toward the cathode and hydroxyl ions ($OH^-$) toward the anode through the wafers and ion exchange membranes. The transport of protons and hydroxyl ions is balanced with the flow of other cations and anions present in the fluid within the ion exchange media of the wafer to maintain the pH in each wafer or portion in its basic state.

In one preferred embodiment, the wafers are arranged in pairs comprising one basic and one acidic wafer. Each basic wafer comprises a porous basic ion exchange resin medium and each acidic wafer comprises a porous acidic ion exchange resin medium. The basic and acidic wafers in each pair are in fluid communication with one another. Alternatively, each wafer can include a porous basic ion exchange resin portion and a porous acidic ion exchange resin portion in fluid communication with one another via a channel or passageway defined as the interface between the two portions adapted to vent $CO_2$-depleted gas from the wafer. The ion exchange media of the wafers preferably include, or are in contact with, a carbonic anhydrase (CA) enzyme [E.C. 4.2.1.1] (or any analogue thereto) to facilitate conversion of bicarbonate ion to $CO_2$ within the acidic wafers or acidic portions and/or the conversion of $CO_2$ to bicarbonate ion in the basic wafers or basic portions.

The plurality of wafers are arranged in a stack, with the cathode at one end of the stack and the anode at the other end of the stack. The cathode, wafers, and anode are interleaved with ion exchange membranes to facilitate a selective flow of ions between the ion exchange media and the electrodes. Each basic resin wafer or basic portion is adapted to introduce a $CO_2$-containing gas stream into the aqueous fluid within the pores of the basic ion exchange medium, and is adapted to vent a $CO_2$-depleted gas stream from the basic ion exchange medium. Each acidic resin wafer or acidic portion is adapted to vent gaseous $CO_2$ out of the acidic ion exchange medium.

In use, any $CO_2$-containing gas stream (e.g., a flue gas) is introduced into an aqueous fluid within the pores of the basic ion exchange medium e.g., through a gas inlet or via a series of microporous membranes or cast channels or other gas delivery method. The $CO_2$ in the gas stream reacts with the basic ion exchange medium of the wafer to form bicarbonate ion. A $CO_2$-depleted gas is then vented from the gas outlet of the basic wafer or basic portion. Bicarbonate-containing fluid circulates from the basic ion exchange medium into the acidic ion exchange medium via a fluid passageway between the basic and acidic wafers or portions thereof, where the acid environment converts bicarbonate to gaseous $CO_2$. The generated $CO_2$ gas is then vented out of the acidic wafer or acidic portion, e.g., via microporous membranes, channels, or via passing through the pores in and around the ion exchange resin or resin wafer per se. The conversion between gaseous $CO_2$ and bicarbonate and/or between bicarbonate and gaseous $CO_2$ preferably is facilitated by inclusion of a CA enzyme in the aqueous fluid or attached within the pores of the acidic and/or basic ion exchange medium. The appropriate pH values of the basic and acidic ion exchange media are maintained by applying an electric potential appropriate to achieve the desired current (e.g., commonly about 1 to 6 volts per cell pair) across the cathode and anode to provide a driving force for transport of protons ($H^+$) toward the cathode and hydroxyl ions ($OH^-$) toward the anode through the wafers and ion exchange membranes. The transport of protons and hydroxyl ions is balanced with the flow of other cations and anions present in the fluid within the ion exchange media of the wafer to maintain the pH in each wafer or portion in its basic or acidic state, as the case may be. This electrochemical pH control mechanism maintains the proper equilibrium between $CO_2$ and bicarbonate in each wafer or wafer portion. The flow of gas into the basic ion exchange medium provides a force that directs fluid flow from the basic ion exchange medium into the acidic ion exchange medium and then back again in a circular fashion.

In the RW-EDI apparatus of the present invention, there is no transport of bicarbonate toward the anode, but carbon dioxide is effectively removed from the gas stream and segregated for later disposal or use. The lack of bicarbonate transport in the present invention reduces the power consumption of the apparatus relative to a conventional EDI system in which bicarbonate would migrate to the anode driven by the electrochemical potential difference between the anode and cathode, and then be converted to $CO_2$ e.g., with the aid of a vacuum or by elevating local temperature. In practice, a prototype of the apparatus of the present invention has achieved nearly 90 volume percent removal of carbon dioxide from a flue gas stream. In addition the prototype device produced carbon dioxide purity approaching 100%.

In one preferred embodiment of the apparatus of the present invention, the cathode and anode are separated by a plurality of alternating porous wafer pairs. Each pair comprises a porous basic ion exchange resin wafer and a porous acidic ion exchange resin wafer separated by a cation exchange membrane (CEM). Each wafer pair is separated from any adjacent wafer pair by an ion exchange membrane, preferably a bipolar membrane (BPM). The cathode is positioned adjacent a basic resin wafer, and separated therefrom by an ion exchange membrane, preferably a BPM. The anode is positioned adjacent an acidic resin wafer and separated therefrom by an ion exchange membrane, preferably a BPM. In this arrangement, bicarbonate circulates within a given pair of wafers but not between different wafer pairs.

In an alternative embodiment, each wafer includes a porous basic ion exchange resin portion at one end and a porous acidic ion exchange resin portion at the other end thereof. The basic and acidic portions are in fluid communication with one another by a channel containing hollow fiber tubes adapted to act as the gas outlet of the basic portion of the wafer. In this configuration, each wafer preferably is separated from adjacent wafers by a passageway defined by an anion exchange membrane (AEM) adjacent to one wafer and a CEM adjacent to the next wafer of the stack (an AEM-CEM pair) in the direction from cathode to anode. Each passageway is in fluid communication with an adjacent wafer such that ion-containing fluid can circulate from the acidic portion of a wafer to the basic portion of the same wafer through the passageway. The cathode is separated from its adjacent wafer by a CEM, and the anode is separated from its adjacent wafer by a passageway defined by an AEM-CEM pair. In this arrangement, bicarbonate circulates between the basic and acidic portions of a given wafer, but not between different wafers, and there is a net flow of protons toward the cathode and hydroxyl ions toward the anode, to provide electrochemical pH control in the basic and acidic resin portions of the wafers.

The present invention could be used to capture $CO_2$ from flue gas from coal, natural gas, or oil power plants or other combustion or industrial processes to prevent release to the atmosphere. In addition, the present invention could be use to capture/separate $CO_2$ from either natural gas or biological methane (biogas) to increase the methane content. Thus, the present invention could be used to mitigate greenhouse gas emissions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PRESENT INVENTION

The present invention provides a resin-wafer electrodeionization (RW-EDI) apparatus for removing carbon dioxide from a gas stream. In one aspect, the RW-EDI apparatus comprises a cathode, and an anode that is separated from the cathode by a plurality of porous solid ion exchange resin wafers. The wafers are arranged in a stack between the cathode and the anode. The stack preferably comprises one or more basic wafers and a number of acidic wafers equal to the number of basic wafers. The wafers are arranged in pairs of basic and acidic wafers, with the basic wafer of a pair being in fluid communication with the acidic wafer of the same pair. Alternatively, each wafer can comprise a basic portion in fluid communication with an acidic portion of the same wafer. Preferably, the pH of fluid within the basic ion exchange medium of the wafers is maintained in the range of about 7.5 to about 9.5, and the pH of fluid within the acidic ion exchange medium, when present, is maintained in the range of about 6 to about 7, by the electric potential applied across the cathode and the anode. Typically, the electric potential applied across the anode and cathode is at least about 1 Volt (e.g., about 1 to 6

Volts in this example) per cell pair for the desired current, although up to about 12 V per cell pair can be applied, for a total voltage of about 12V-times the total number of cell pairs+about 5 V. The actual voltage per cell pair will vary with the thickness of the wafers, as will be evident to those of ordinary skill in the art. Thicker wafers will require higher voltages. Preferably, the voltage per cell pair will be greater than 1 V if the wafer thickness is greater than 1 mm. Typically, the wafers will have a thickness in the range of about 1 mm to about 20 mm. However, greater wafer thickness may still work. The determination of an appropriate working voltage is within the level of ordinary skill in the art.

Each basic wafer or basic portion contains a porous basic ion exchange medium and each acidic wafer or acidic portion contains a porous acidic ion exchange medium. Each basic wafer or basic portion is adapted for introducing a $CO_2$-containing gas into an aqueous fluid within the basic wafer or portion to convert $CO_2$ from the gas into bicarbonate ion. The bicarbonate then flows into an acidic wafer or acidic portion that is in fluid communication with the basic wafer or basic portion to convert bicarbonate ion into $CO_2$ gas. Each basic wafer or basic portion also is adapted to vent a $CO_2$-depleted gas therefrom; and each acidic wafer or acidic portion is adapted to vent $CO_2$ gas generated in the acidic wafer or acidic portion. Gas can be introduced into or vented from the wafers or portions thereof via gas inlet and/or outlet tubes, via microporous membranes or channels in contact with or connected to the wafers or portions, or by any other suitable structure. The cathode, wafers, and anode are interleaved with ion exchange membranes, and collectively direct a net flow of protons through the wafers toward the cathode and a net flow of hydroxyl ions through the wafers toward the anode, when an electric potential is applied to across cathode and anode. The flow of protons and hydroxyl ions, combined with the capture and release of $CO_2$, maintains a basic pH in each basic wafer or basic portion and an acidic pH in each acidic wafer or acidic portion.

In one embodiment, the plurality of wafers comprises pairs of alternating basic and acidic wafers with a basic wafer and an acidic wafer in each pair, and a cation exchange membrane between the basic and acidic wafers of the pair. The cathode is positioned adjacent to a basic wafer with a bipolar membrane therebetween, while the anode is positioned adjacent to an acidic wafer with a bipolar membrane therebetween. Each pair of wafers is separated from any adjacent pair by a bipolar ion exchange membrane.

In another embodiment, each wafer comprises a basic portion comprising a porous basic ion exchange medium and an acidic portion comprising a porous acidic ion exchange medium in fluid communication with the basic portion at a gas-vented juncture defined at the interface between the basic portion and the acidic portion of the wafer. Each wafer is separated from any adjacent wafer by a fluid-flow passageway in fluid communication with the basic and acidic portions of the same wafer. The passageway is defined by a spaced pair of an anion exchange membrane adjacent to one wafer and a cation exchange membrane adjacent to the next wafer in the stack in the direction from cathode to anode. The cathode is separated from an adjacent wafer by a cation exchange membrane, and the anode is separated from an adjacent wafer by a passageway defined by a spaced pair of an anion exchange membrane and a cation exchange membrane. The vented juncture between the basic and acidic portions of each wafer is adapted to vent the $CO_2$-depleted gas from the wafer. Preferably, the juncture between the basic portion and the acidic portion of each wafer comprises hollow fiber tubes adapted to vent the $CO_2$-depleted gas from the wafer. Other gas exit (gas/liquid separation) strategies known in the art are equally acceptable.

The acidic ion exchange medium can contain a carbonic anhydrase enzyme or enzyme or catalyst analogues thereto to facilitate conversion of bicarbonate ion to gaseous $CO_2$. The carbonic anhydrase enzyme can be chemically or biochemically bound to the acidic ion exchange medium, if desired. In addition, or alternatively, the basic ion exchange medium of a wafer can absorb a carbonic anhydrase enzyme to facilitate conversion of gaseous $CO_2$ to bicarbonate ion. The carbonic anhydrase enzyme also can be chemically or biochemically bound to the basic ion exchange medium, if desired.

In a preferred apparatus aspect, the apparatus comprises a cathode, and an anode that is separated from the cathode by a plurality of porous solid ion exchange resin wafers arranged in a stack between the cathode and the anode. The wafers are arranged in pairs of alternating basic and acidic wafers with a basic wafer and an acidic wafer in each pair, and a cation exchange membrane between the basic and acidic wafers of the pair. The cathode is positioned adjacent to a basic wafer with a bipolar membrane therebetween, while the anode is positioned adjacent to an acidic wafer with a bipolar ion exchange membrane therebetween. Each pair of wafers is separated from any adjacent pair by a bipolar ion exchange membrane. The stack of wafers alternates from basic to acidic to basic, etc. in the direction from the cathode to the anode. Each basic wafer comprises a porous basic ion exchange medium and each acidic wafer comprises a porous acidic ion exchange medium. Each basic wafer is adapted for introducing a $CO_2$-containing gas into an aqueous fluid within the basic wafer to convert $CO_2$ from the gas into bicarbonate ion, which then flows into the an acidic wafer of the pair to convert bicarbonate ion into $CO_2$ gas, as described above. Each basic wafer also is adapted to vent a $CO_2$-depleted gas therefrom, and each acidic wafer includes a $CO_2$ outlet to vent $CO_2$ gas generated in the acidic wafer, as described above.

The cathode, wafers, cation exchange membranes, bipolar ion exchange membranes, and the anode together direct a net flow of protons through the wafers toward the cathode and a net flow of hydroxyl ions through the wafers toward the anode when an electric potential is applied to the cathode and anode. The flow of protons and hydroxyl ions, balanced with the capture and release of $CO_2$, maintains a basic pH in each basic wafer portion and an acidic pH in each acidic wafer.

The acidic ion exchange medium preferably contains a carbonic anhydrase enzyme to facilitate conversion of bicarbonate ion to gaseous $CO_2$. The carbonic anhydrase enzyme can be chemically bound to the acidic ion exchange medium, if desired. In addition, or alternatively, the basic ion exchange medium can contain a carbonic anhydrase enzyme to facilitate conversion of gaseous $CO_2$ to bicarbonate ion, which can be chemically bound to the basic ion exchange medium, if desired.

Figure 1:
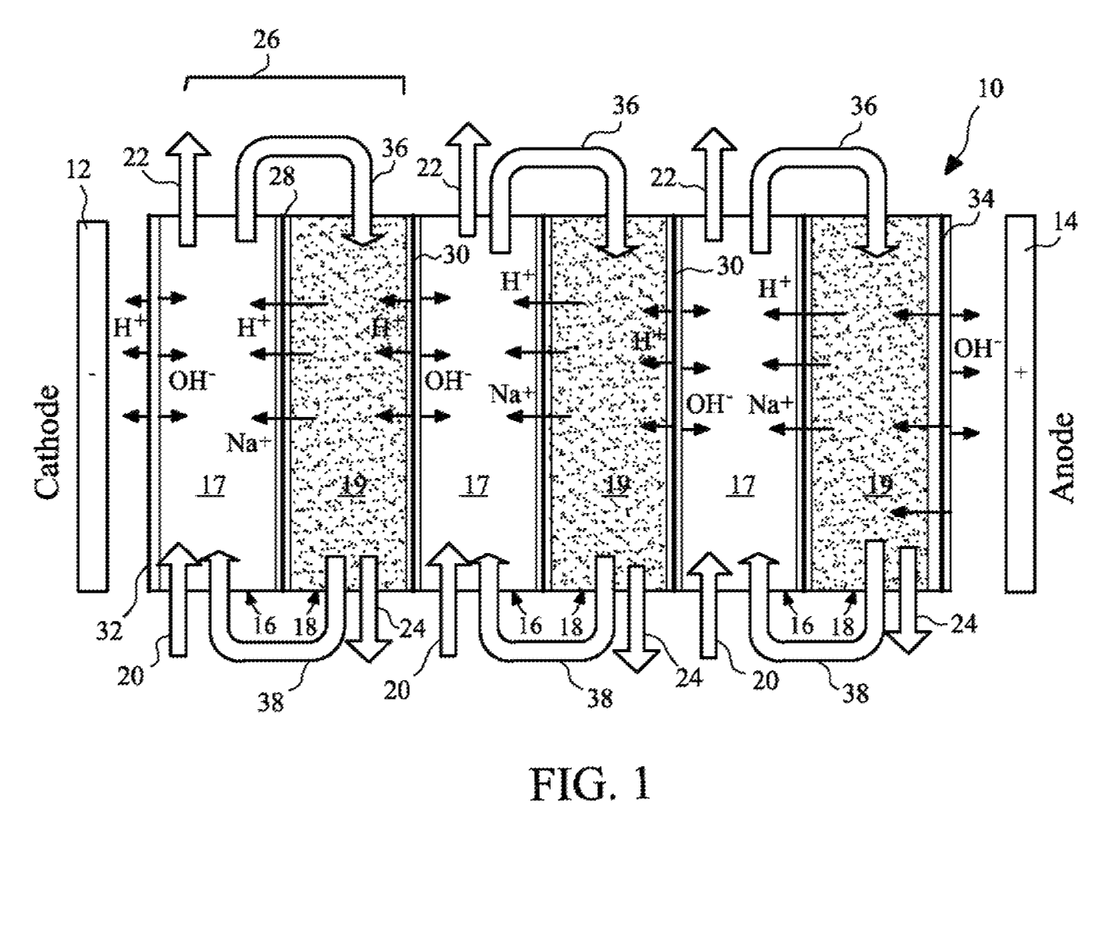
FIG. 1 is a schematic illustration of one embodiment of the apparatus of the present invention, in which the plurality of wafers are arranged in pairs, with one basic wafer and one acidic wafer in each pair.

FIG. 1 schematically illustrates an embodiment of a RW-EDI apparatus of the present invention. Apparatus 10 comprises a cathode 12 and an anode 14, separated by a plurality of porous solid ion exchange resin wafers 16 and 18 arranged in pairs 26 of alternating wafers 16 and 18. Each pair 26 includes a basic wafer 16 containing a porous basic ion exchange medium 17, and an acidic wafer 18 containing an acidic ion exchange medium 19. Basic wafer 16 includes a gas inlet structure 20 for introducing a $CO_2$-containing gas into an aqueous fluid within the basic ion exchange medium 17, and an opposed gas outlet structure 22 to vent a $CO_2$-depleted gas from the wafer. Wafers 16 and 18 of each pair 26 are separated from one another by a cation exchange membrane 28. Each pair 26 is separate from any adjacent pair 26 by a bipolar ion exchange membrane 30, with an acidic wafer 18 of one pair 26 facing a basic wafer 16 of another pair 26. Cathode 12 is positioned adjacent to a basic wafer 16, with a bipolar ion exchange membrane between cathode 12 and wafer 16. Anode 14 is positioned adjacent to an acidic wafer 18, with a bipolar ion exchange membrane between anode 14 and wafer 18.

During use, an electric potential is applied across cathode 12 and anode 14, while a $CO_2$-containing gas stream (e.g., a flue gas) is introduced into an aqueous fluid within each wafer 16 via gas inlet structure 20. The basic ion exchange medium 17 converts $CO_2$ into bicarbonate ion. $CO_2$-depleted gas is vented from each wafer 16 through outlet structure 22. Bicarbonate-containing aqueous fluid flows from basic wafer 16 into acidic wafer 18 via a fluid passageway 36 between wafer 16 and wafer 18, propelled by the gas stream. The bicarbonate is converted to gaseous $CO_2$ by acidic ion exchange medium 19 of wafer 18. Each wafer 18 includes a $CO_2$ outlet structure 24 to vent gaseous $CO_2$ out of wafer 18. Bicarbonate-depleted fluid flows from wafer 18 back into wafer 16 via an opposed fluid flow passageway 38. Horizontal arrows in FIG. 1 denote the flow of ions within apparatus 10 when in use. The flow of bicarbonate ion-containing aqueous fluid from wafer 16 of a pair 26 into wafer 18 of the same pair 26, and subsequent conversion of the bicarbonate ion to gaseous $CO_2$ in wafer 18 effectively prevents any net flow of bicarbonate ion from one pair 26 to another pair 26. Bipolar membranes 30, 32, and 34 allow balancing counter ions to flow from one wafer 16 or 18 to another as well as to cathode 12 and anode 14, such that there is a net flow of protons toward cathode 12 and a net flow of hydroxyl ions toward anode 14, thereby maintaining a basic pH in basic ion exchange medium 17 and an acidic pH in acidic ion exchange medium 19.

A prototype apparatus of the type schematically shown in FIG. 1 was prepared and tested with and without CA enzyme present in the aqueous fluid. The results of the evaluation are summarized in Tables 1 and 2.

In Tables 1 and 2, "$CO_2$ Adsorption" is the $CO_2$ adsorption ratio, which is defined as the decrease amount of $CO_2$ divided by the amount of $CO_2$ in the initial gases (e.g., the flue gas). "$CO_2$ Desorption" is the $CO_2$ desorption ratio, defined as the decrease of bicarbonate in the liquid divided by the bicarbonate in the liquid after adsorption chamber. "$CO_2$ Capture" refers to the percentage of the total amount of $CO_2$ removed from the gas stream. "Power Consumption" refers to the calculated power in kiloWatt-hours (kWh) utilized to capture 1 Kg of $CO_2$.

TABLE 1

RW-EDI without CA enzyme.

| Operation time | $CO_2$ Adsorption | $CO_2$ Desorption | $CO_2$ Capture | Power Consumption |
|---|---|---|---|---|
| 60 min | 77% | 74% | 56.6% | 2.1 |
| 120 min | 70% | 57% | 39.9% | 2.7 |

TABLE 2

RW-EDI with CA enzyme.

| Operation time | $CO_2$ Adsorption | $CO_2$ Desorption | $CO_2$ Capture | Power Consumption |
|---|---|---|---|---|
| 60 min | 108% | 69% | 74% | 2.2 |
| 120 min | 97% | 92% | 89% | 1.4 |
| 180 min | 94% | 83% | 78% | 1.3 |

The resin wafers are fabricated from commercial grade resins (PUROLITE® resins; The Purolite Co.). The resin wafers with different cation/anion mixing ratios were fabricated using the process described in U.S. Pat. Nos. 6,797,140, 7,306,934, and 7,452,920. Commercial polymeric ion-exchange membranes (Ameridia Inc.) were used in assembling the RW-EDI stack. Different membrane configurations were evaluated. A commercial ED stack of 195 cm² membrane size was used as the base template to assemble the EDI stack. Two cell pairs were used for the evaluations. A 10% $CO_2$ gas (balance $N_2$) was fed directly into the capture compartments. Solution bicarbonate concentrations were analyzed by a total organic carbon (TOC) analyzer. All the samples were conditioned with NaOH and kept in sealed sample vials to avoid atmosphere exchange of $CO_2$. Around 3-6 volts were applied in the EDI between cathode and anode. The pH of the basic and acidic chambers were around 8.5 and 6.5, respectively.

Another set of experiments included direct analysis of the feed gas composition (typically 15% $CO_2$ in air), direct analysis of the $CO_2$ in the "retentate" (the gas exiting the capture side of the EDI stack), and analysis of the product $CO_2$ stream after dilution with a known flow rate of argon (dilution allows use of concentration measurements). The gas analysis was performed on a MAX 300-LG Laboratory Gas Analyzer (Extrel CMS, LLC) equipped with a 16-place Valco inlet valve and operated using Questor V software (this is a Residual Gas Analysis Mass Spectrometer). The solution pH values fell between 6.9 and 9.1 for the separate flow experiments with pH increasing through the capture path and decreasing through the release path when the power was turned on. For the recirculation of $CO_2$ transport fluid the capture outlet had a pH as high as 9.7 and the release outlet had a pH as low as 7.0.

From the data in Tables 1 and 2, it is evident that CA enzyme enhances the efficiency of $CO_2$ capture and power consumption for an apparatus of a given size. Efficiency of a system without CA enzyme can be improved by increasing the size/volume of the resin wafers and/or the number of resin wafers in the apparatus.

Data from the experiments where the $CO_2$ transport fluid was recirculated between the capture and release zones (presented as mol/min of $CO_2$ captured) are presented in Table 3.

TABLE 3

Summary for CO$_2$ Capture by EDI in CO$_2$ Transport Fluid Recycle Mode

| EDI in recycle mode | | Average amount (micro-mol/min) | | |
|---|---|---|---|---|
| Solution | | of pure CO$_2$ produced | | |
| Chemistry | Enzyme Condition | No Current | 150 mA | 300 mA |
| 0.05M NaH$_2$PO$_4$ | no enzyme | 15 | 18 | 25 |
| 0.05M NaH$_2$PO$_4$ | with 3 g/L CA | 20 | 24 | 26 |
| 1M KHCO$_3$ | no enzyme | | 22.5 | 40 |
| 1M KHCO$_3$ | with 3 g/L CA | | 27.1 | 43 |

The data in Table 3 show there is an increase in the amount of CO$_2$ captured under a given solution chemistry/applied current condition when enzyme is added. There is also a clear increase in the amount of CO$_2$ captured for a given solution chemistry/enzyme condition when the applied current is increased. The greatest amount of CO$_2$ capture was achieved for the 1M KHCO$_3$ based solution operated with enzyme and an applied current of 300 mA.

In another apparatus aspect of the invention the RW-EDI apparatus comprises a cathode, and an anode that is separated from the cathode by a plurality of porous solid ion exchange resin wafers arranged in a stack between the cathode and the anode. Each wafer comprises a basic portion containing a porous basic ion exchange medium and an acidic portion containing a porous acidic ion exchange medium in fluid communication with the basic ion exchange medium at a gas-vented juncture defined at the interface between the basic portion and the acidic portion of the wafer. Each wafer is separated from any adjacent wafer by a fluid-flow passageway in fluid communication with the basic and acidic portions of the same wafer. The passageway is defined by a spaced pair of an anion exchange membrane and a cation exchange membrane. The cathode is separated from an adjacent wafer by a cation exchange membrane, while the anode is separated from an adjacent wafer by a passageway defined by a spaced pair of an anion exchange membrane and a cation exchange membrane.

Each basic portion of the wafer includes a gas inlet structure for introducing a CO$_2$-containing gas into an aqueous fluid within the basic ion exchange medium to convert CO$_2$ from the gas into bicarbonate ion. The bicarbonate then flows into the acidic portion to convert bicarbonate ion into CO$_2$ gas. A channel or passageway defined at the interface between the basic and acidic portions of the wafer vent CO$_2$-depleted gas from the wafer. The acidic portion of each wafer includes a CO$_2$ outlet structure to vent CO$_2$ gas generated therein. For example, the interface between the basic portion and the acidic portion of each wafer comprises hollow fiber tubes adapted to vent the CO$_2$-depleted gas from the wafer. Other methods can be used to direct the gas away from the wafer. A preferred method for removing the CO$_2$ depleted gas comprises inverted cones positioned adjacent the wafers, like those used to remove product gas in some anaerobic digesters.

The cathode, wafers, cation exchange membranes, anion exchange membranes, and the anode together direct a net flow of protons through the wafers toward the cathode and a net flow of hydroxyl ions through the wafers toward the anode when an electric potential is applied across the cathode and anode, to thereby maintain a basic pH in each basic wafer portion and an acidic pH in each acidic wafer.

Preferably, the acidic ion exchange medium and/or the basic ion exchange medium contains a carbonic anhydrase enzyme [E.C. 4.2.1.1] (or any analogue thereto) to facilitate conversion of bicarbonate ion to gaseous CO$_2$ and/or the conversion of CO$_2$ to bicarbonate ion, respectively. The carbonic anhydrase enzyme can be chemically or biochemically bound to the acidic and/or basic ion exchange medium, if desired.

Figure 2:
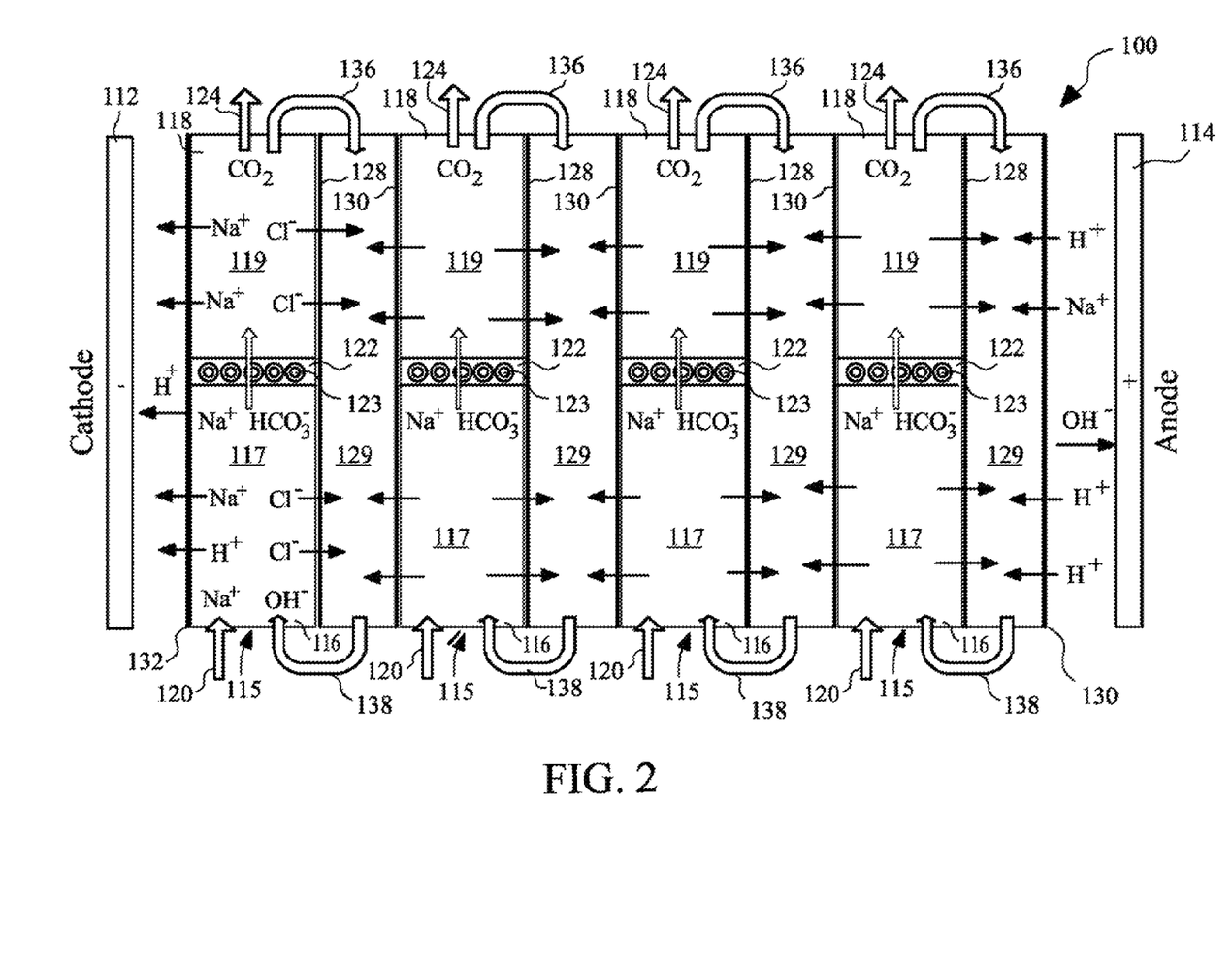
FIG. 2 is a schematic illustration of an embodiment of the apparatus of the present invention, in which the each wafer includes a basic ion exchange medium portion and an acidic ion exchange medium portion.

FIG. 2 illustrates another embodiment of a RW-EDI apparatus of the present invention. Apparatus 100 comprises a cathode 112 and an anode 114, separated by a plurality of porous solid ion exchange resin wafers 115. Each wafer 115 includes an acidic portion 116 and an opposed basic portion 118. Each basic portion 116 contains a porous basic ion exchange medium 117, and each acidic portion 118 contains an acidic ion exchange medium 119. Basic portion 116 includes a gas inlet structure 120 for introducing a CO$_2$-containing gas into an aqueous fluid within the basic ion exchange medium 117. Juncture 122 between basic portion 116 and acidic portion 118 of each wafer 115 acts as a gas outlet to vent a CO$_2$-depleted gas from the wafer, e.g., through hollow fibers 123.

Each acidic portion 118 includes a CO$_2$ outlet structure 124 to vent gaseous CO$_2$ out of portion 118. Each wafer 115 is separate from any adjacent wafer 115 by a fluid flow passageway 129 defined by a spaced pair of an anion exchange membrane 128 and a cation exchange membrane 130, arranged in the same order throughout the apparatus in the direction from cathode 112 to anode 114. Cathode 112 is separated from its adjacent wafer 115 by a cation exchange membrane 132. Anode 114 is separated from its adjacent wafer 115 by a passageway 129 defined by a spaced pair of an anion exchange membrane 128 and a cation exchange membrane 130, with membrane 130 being immediately adjacent to anode 114.

During use, an electric potential is applied across cathode 112 and anode 114, while a CO$_2$-containing gas stream (e.g., a flue gas) is introduced into an aqueous fluid within each wafer 115 via gas inlets 120. The basic ion exchange medium 117 converts CO$_2$ into bicarbonate ion. CO$_2$-depleted gas is vented from each wafer 115 through outlet juncture 122 (e.g., via hollow fiber tubes 123). Bicarbonate-containing aqueous fluid flows from basic wafer portion 116 into acidic wafer portion 118 via juncture 122, propelled by the gas stream. The bicarbonate is converted to gaseous CO$_2$ by the acidic ion exchange medium 119 of portion 118, and bicarbonate-depleted fluid flows from portion 118 back into portion 116 via passageway 129. Horizontal arrows in FIG. 2 denote the flow of ions within apparatus 100 when in use. The flow of bicarbonate ion-containing aqueous fluid from basic portion 116 into acidic portion 118 of the same wafer 115, and subsequent conversion of the bicarbonate ion to gaseous CO$_2$ in acidic portion 118 effectively prevents any net flow of bicarbonate ion from one wafer 115 to another wafer 115. Ion exchange membranes 128, 130, and 132 allow balancing counter ions to flow from one wafer 115 to another as well as to cathode 112 and anode 114, such that there is a net flow of protons toward cathode 112 and a net flow of hydroxyl ions toward anode 114, thereby maintaining a basic pH in basic ion exchange medium 117 and an acidic pH in acidic ion exchange medium 119. The thickness or other dimensions of the adsorption (basic wafer) and desorption (acidic wafer) cells could be different to accommodate different rates of adsorption and desorption.

In another format, the adsorption cell to be used without a desorption cell. In this format CO$_2$ gas will be removed from a mixed gas stream and be available as a concentrated bicarbonate solution. Bicarbonate solutions have applications such as enhancing algae production or for other CO$_2$ uses.

A method aspect of the present invention comprises applying an electric potential across the cathode and anode of RW-EDI apparatus of the invention, and introducing a $CO_2$-containing gas into an aqueous fluid within the pores of the basic ion exchange medium within each basic wafer or basic portion of a wafer of the apparatus through the gas inlet thereof, venting $CO_2$-depleted gas from the gas outlet of each basic wafer or basic portion, and venting gaseous $CO_2$ from the $CO_2$ outlet of each acidic wafer or acidic portion of a wafer. In some preferred embodiments, the gaseous $CO_2$ is collected for later use or disposal. Preferably, the electric potential applied across the cathode and the anode is in the range of about 1 to 6 volts per cell pair. The $CO_2$ gas and/or the $CO_2$-depleted gas can be vented at atmospheric pressure. Preferably, the pH of fluid within the basic ion exchange medium of the wafers is maintained in the range of about 7.5 to about 9.5, and the pH of fluid within the acidic ion exchange medium is maintained in the range of about 6 to about 7, by the electric potential applied across the cathode and the anode.

Desorption of $CO_2$ from bicarbonate under acidic conditions is a crucial step in the $CO_2$ removal process, because it is not as kinetically favored as the absorption of $CO_2$ to form bicarbonate ion under basic conditions. Because of this kinetic difference, it is preferable to include a carbonic anhydrase enzyme within the aqueous fluid in the ion exchange media, since the CA enzyme catalyzes the rate of conversion of bicarbonate to gaseous $CO_2$ by a factor of about 3 to 4.

In some conventional $CO_2$ removal processes a vacuum is used to drive the equilibrium toward gaseous $CO_2$, however, this adds considerable capital expense and energy costs to such systems. The RW-EDI apparatus of the present invention eliminates the need for vacuum systems, particularly in embodiments that incorporate CA enzyme. Suitable CA enzymes are known in the art, such as for example, those as described in U.S. Pat. No. 6,143,556 (Trachtenberg; incorporated herein by reference in its entirety), U.S. Patent Publication No. 2008/0003662 (Trachtenberg; incorporated herein by reference in its entirety), and the CA enzymes available from Carbozyme, Inc. (Monmouth Junction, N.J.).

In some embodiments, it may be preferable to immobilize the CA enzyme within the ion exchange media of the wafers. In such cases, the enzyme can be immobilized by any suitable method known in the art, such as the method described in U.S. Pat. No. 7,306,934 (Arora et al.; incorporated herein by reference in its entirety).

Porous solid resin wafer ion exchange materials suitable for use in the present invention can be prepared in any suitable manner known in the art, such as for example the materials and methods described in U.S. Pat. No. 6,495,014 (Datta et al., incorporated herein by reference in its entirety), U.S. Pat. No. 7,452,920 (Lin et al., incorporated herein by reference in its entirety), and U.S. Pat. No. 7,306,934 (Arora et al.).

The apparatus and method of the present invention provide a number of benefits, including without limitation, providing a purified $CO_2$ stream from a dilute flue gas. The purified $CO_2$ obtained with the apparatus and methods of the present invention can conveniently be recovered for use in other industrial processes, if desired. In addition, no vacuum is needed to recover the purified $CO_2$ from the flue gas, thus reducing energy and capital costs relative to conventional $CO_2$ removal processes. The apparatus and methods of the present invention also can be readily produced at any desired scale.

The apparatus and method has several useful applications. It can be used to capture $CO_2$ from flue gas from coal, natural gas, or oil power plants or other combustion or industrial processes to prevent release to the atmosphere. In addition, the present invention could be use to capture $CO_2$ from either natural gas or biological methane (biogas) to increase the methane content. Thus the present invention could be used to mitigate greenhouse gas emissions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A resin-wafer electrodeionization (RW-EDI) apparatus for removing carbon dioxide from a gas stream, the apparatus comprising:
   a cathode; and
   an anode that is separated from the cathode by a plurality of porous solid basic ion exchange resin wafers, wherein the cathode, anode, and wafers are interleaved with bipolar ion exchange membranes;
   the plurality of wafers being arranged in a stack between the cathode and the anode;
   each basic wafer comprising a porous basic ion exchange medium;
   each basic wafer being adapted to (a) introduce a $CO_2$-containing gas into an aqueous transport fluid within the basic ion exchange medium to convert $CO_2$ from the gas into bicarbonate ion, and (b) vent a $CO_2$-depleted gas therefrom;
   wherein the basic wafers contain the aqueous transport fluid comprising $KHCO_3$ or $NaH_2PO_4$;

wherein in use, the transport fluid flows through each basic wafer and bicarbonate ion is concentrated in the transport fluid, and the basic pH of the basic ion exchange medium is maintained by application of an electric potential across the anode and cathode.

2. The apparatus of claim 1 wherein the basic ion exchange medium of each wafer contains a carbonic anhydrase enzyme to facilitate conversion of gaseous $CO_2$ in bicarbonate ion.

3. The apparatus of claim 2 wherein the carbonic anhydrase enzyme is chemically bound to the basic ion exchange medium thereof to facilitate conversion of gaseous $CO_2$ into bicarbonate ion.

4. The apparatus of claim 1, wherein each wafer has a thickness in the range of about 1 mm to about 20 mm.

5. A method of removing $CO_2$ from a gas stream comprising introducing a $CO_2$-containing gas into the aqueous transport fluid flowing through the basic ion exchange medium of each wafer of the apparatus of claim 1 while applying an electric potential across the cathode and anode of the apparatus to convert $CO_2$ from the gas into bicarbonate ion and thereby concentrate the bicarbonate in the transport fluid.

6. The method of claim 5 wherein the pH of the aqueous fluid within the basic ion exchange medium of each wafer is maintained in the range of about 7.5 to about 9.5 by application of the electric potential across the cathode and the anode.

* * * * *